March 1, 1932.  E. P. HALLIBURTON  1,847,088
AIRPLANE CONTROL
Filed May 15, 1928    3 Sheets-Sheet 1

Inventor
Erle P. Halliburton
By Lyon & Lyon
Attorneys

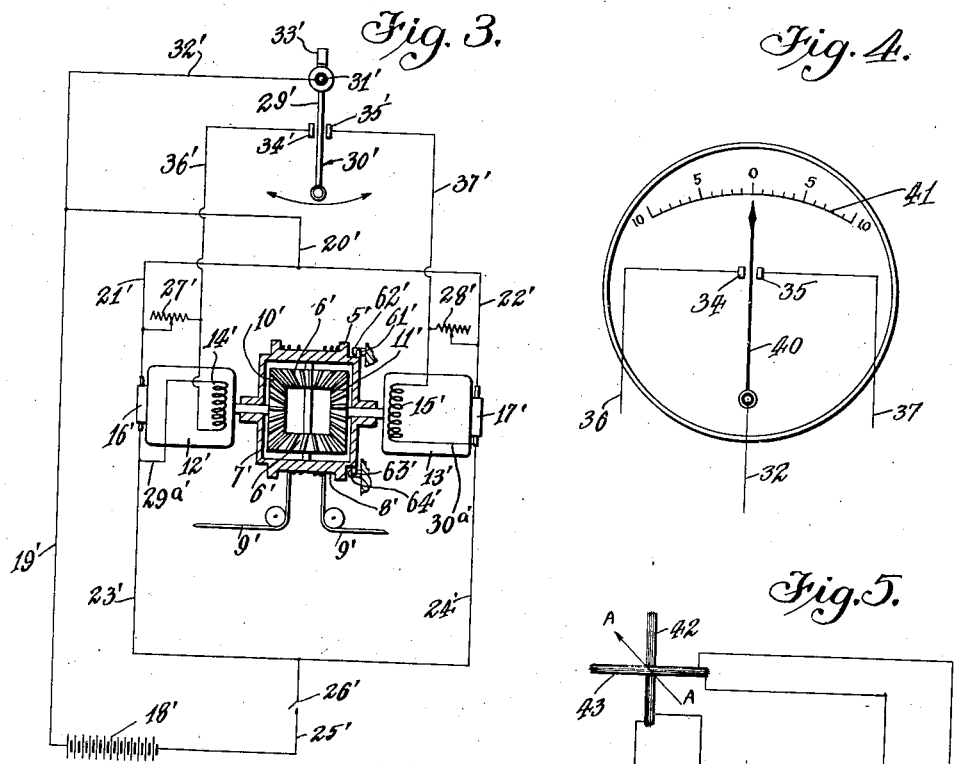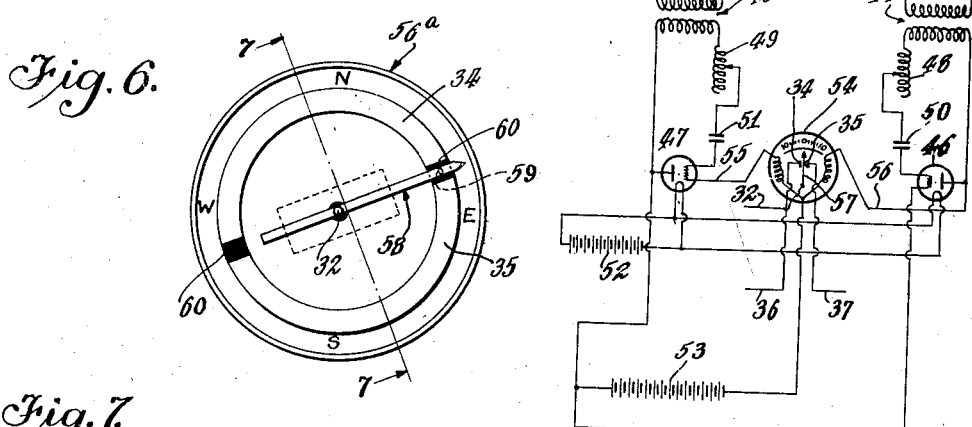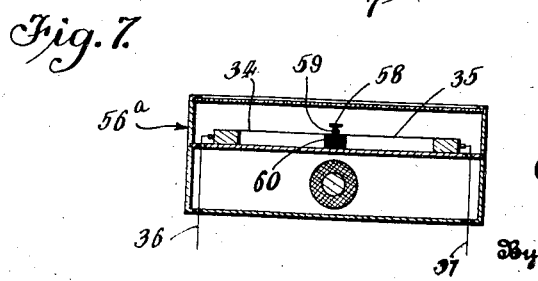

March 1, 1932.  E. P. HALLIBURTON  1,847,088
AIRPLANE CONTROL
Filed May 15, 1928   3 Sheets-Sheet 3
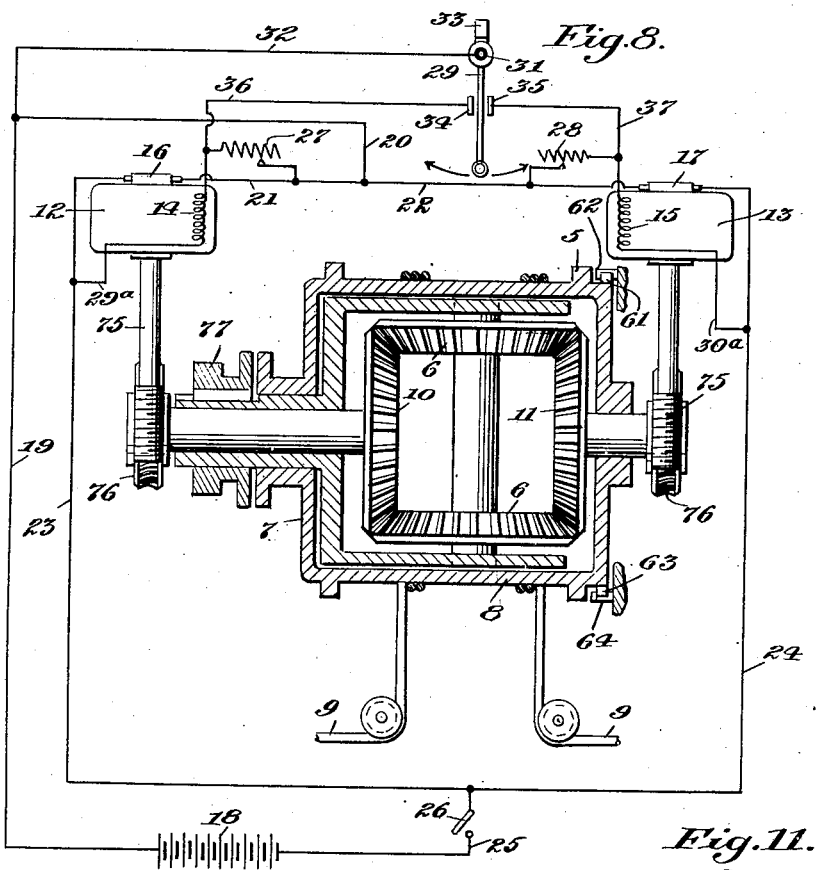
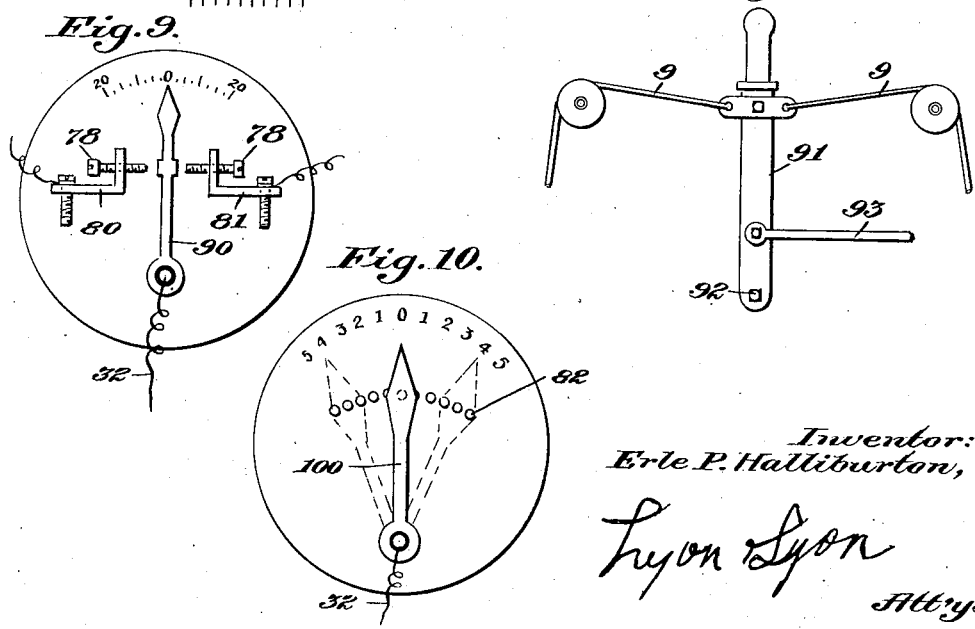
Inventor:
Erle P. Halliburton,
Lyon Lyon
Att'ys.

Patented Mar. 1, 1932

1,847,088

UNITED STATES PATENT OFFICE

ERLE PALMER HALLIBURTON, OF DUNCAN, OKLAHOMA

AIRPLANE CONTROL

Application filed May 15, 1928. Serial No. 278,018.

This invention relates to an airplane and refers particularly to an airplane having an automatic means for controlling the flight of the airplane.

Heretofore, only with great difficulty and at great risk of life have the most skillful pilots been able to fly through fog or the elements when the earth is not visible.

It is an object of the present invention to provide an airplane having means by which it may be automatically maintained in straight flight.

More particularly, an object of the present invention consists in means for controlling the ailerons, elevators or flippers and the rudder of an airplane so that these members may be coordinated to maintain the ship in straight flight and on a direct compass course automatically.

Another object of the present invention is to provide a means whereby the apparatus operates automatically to maintain flying speed by nosing the ship over in case of a dead motor.

Another object of the invention is to automatically control the airplane so as to maintain it on a fixed course by controlling the instrumentalities which regulate its vertical, longitudinal and lateral planes of flight.

Another object of the present invention is to provide method and means for controlling a throttle of the engine to maintain a predetermined air speed.

Another object of the present invention is to control all of the elements ordinarily manually controlled by the pilot by automatic means.

Another object of the invention is to provide an automatic means for controlling the lateral or vertical inclination of the plane automatically, which means may be dispensed with when it is desired to control the airplane manually.

Another object of the invention is to provide a plurality of instrumentalities for controlling an airplane, any one of which may be dispensed with so as to control the airplane manually and allow the others to function automatically.

Other objects will appear hereinafter throughout the specification.

An airplane is controlled by its rotation about three axes. It turns about a vertical or rudder axis, banks about its longitudinal axis and pitches about its lateral axis. The later two axes in normal flight are horizontal while the rudder axis in normal straight flight is vertical. The movement of all three controls are frequently simultaneous and are to some extent interrelated, but each must be considered separately as affecting the motion of the airplane about its respective axes. The rudder revolves the plane about the vertical, or rudder axis. The ailerons bank the plane about the longitudinal axis and the flippers, or elevators, pitch the ship about the lateral axis.

When the ground can be observed it is easy for the pilot to keep track of his maneuvers about the three axes, but when flying blind in fog, or clouds, or at night, it is necessary to use instruments to replace the invisible ground. The present invention provides a method and means for automatically controlling all of the control surfaces of an airplane by interconnecting the indicating, or recording, instruments, causing these recording instruments to control the movement of the respective control surfaces, thus taking the manual operation of the control out of the hands of the pilot. That is to say, a means is provided for automatically operating the various control surfaces of the airplane and these are connected with means leading to the indicators so that the automatic means will automatically maintain the ship at any desired position relative to its three axes. That is, the bank indicator will automatically control the ailerons to maintain the plane at a fixed position relative to its longitudinal axis; the pitch indicator will automatically control the flippers to maintain the plane at a fixed position relative to its lateral axis, and an earth inductor compass, a radio beacon or a turn indicator will automatically control the plane about its rudder axis.

I have also provided additional means for controlling the speed and altitude of the airplane. An air speed indicator automatically controls the speed of the ship and an altimeter or similar instrument automatically controls the altitude of the ship.

The present instruments are very accurate and record the movement of the ship about its several axes, but the most skillful pilot while flying blind, such as in a fog, experiences great difficulty in watching all of the instruments, that is, pitch indicator, bank and turn indicator, and compass, and at the same time watch all of the other instruments necessary to flight and simultaneously cause the mind and muscle to coordinate to maintain the stability of the ship about its three axes.

The present airplane and method and apparatus of controlling same to automatically stabilize the airplane, with respect to its three axes, will be best understood from the description of one form or example of the method and means of controlling an airplane embodying the present invention. For this purpose it is hereafter described with reference to the accompanying drawings, the preferred form or example of the invention.

Referring to the drawings:

Figure 3 is a diagram of a control means to the airplane showing its interconnection with one of the indicating members or members responsive to the speed or altitude or rotation of the airplane about one of its axes.

Figure 4 is a diagrammatical illustration of the method of connection with the control mechanism and another form of indicator.

Figure 5 is a diagram of an apparatus for connecting a control mechanism for automatically maintaining the ship headed towards a radio beacon.

Figures 6 and 7 are respectively planned in an elevation of indicating mechanism for maintaining the ship in the desired position relative to the compass.

Figure 8 is a diagram of the preferred control means which I employ to control the airplane, showing its interconnection with one of the indicating members or members responsive to the altitude or speed or rotation of the airplane about one of its axes.

Figure 9 is a diagrammatical illustration of the method of connection with the control mechanism and still another form of indicator.

Figure 10 is a diagrammatical illustration of the method of connection with the control mechanism and still another form of indicator, and Figure 11 is a view showing connections for controlling the throttle of the airplane.

Figure 1:
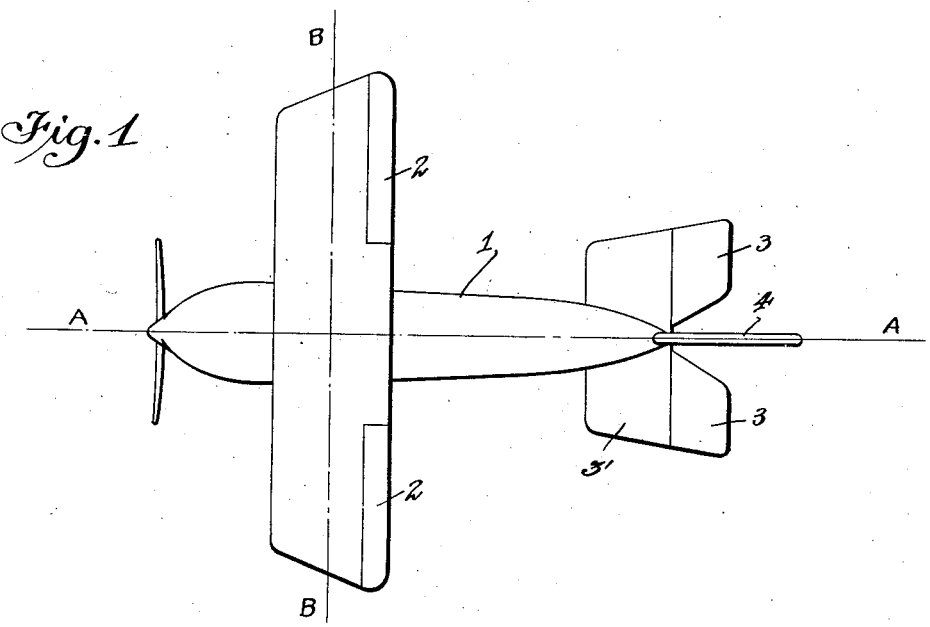
Figure 1 is a plan view of an airplane.
Figure 2:
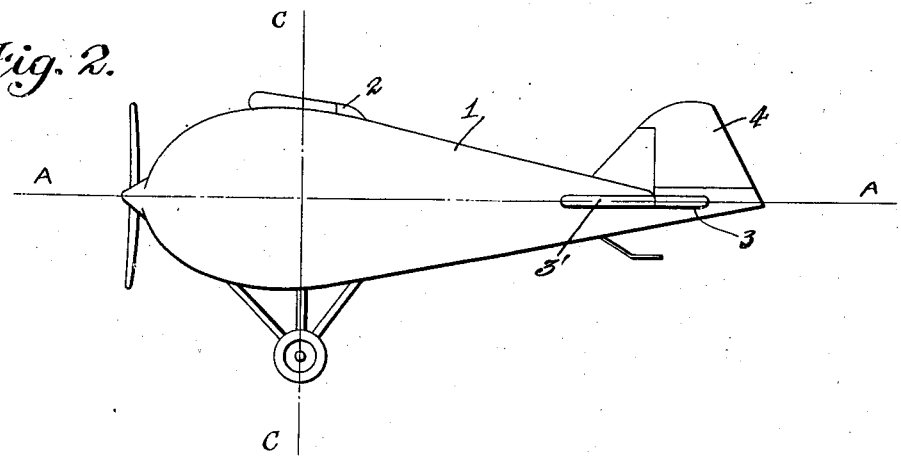
Figure 2 is an elevation of an airplane.

Referring to the drawings, 1 indicates an airplane provided with ailerons 2 which serve as a means for effecting the rotation of the plane about its longitudinal axis A. 3 indicates the elevators, or flippers and 3a indicates the stabilizer, which control the rotation of the ship about its lateral axis B. 4 indicates a rudder which serves as a means for controlling the movement or turning of the ship about its vertical or rudder axis C.

The present invention provides a means for automatically controlling the ailerons 2, flippers 3, stabilizer 3a and rudder 4 by instruments responsive to the degree of rotation of the ship about its several axes. As the means for automatically operating the ailerons, rudder, stabilizer and flippers may be substantially identical if desired, except for the connection with the different instruments, only two of said means is herein described, a description being given, however, of the means of connecting such an apparatus with the other instruments for controlling the other moving surfaces of the plane.

Referring to Figure 8, in the preferred form of the invention I employ a differential 5, the planet gears 6 of which are mounted by a revolvable housing 7 having a drum surface 8 which receives the lines 9 leading to the surfaces of the airplane which are to be controlled or to the throttle control. In Figure 8 the apparatus is illustrated for the purpose of controlling the revolution of the plane about its lateral axis and the lines 9 therefore may be considered as leading to the ailerons of the ship and connected therewith in any usual or preferred manner to elevate one of the ailerons while depressing the other.

The sun gears of the differential 10 and 11 are respectively connected through irreversible worms 75 which drive worm gears 76. Interposed between worm gears 76 and the drum 8 is preferably a suitable clutch 77 which upon operation may connect or disconnect the drum 8 from the planet gears of the differential. In this manner the drum 8 may be operated manually and the automatic control may be dispensed with. When it is desired to operate the controls automatically the clutch is drawn in so as to connect the planet gears again with the drum 8. The clutch, for example, could be a magnetic clutch and the handle of the hand control not shown could have a button or switch to disconnect the clutch instantly when it is desired to control the plane by hand. In this instance the drum 8 may be driven by hand control which will permit the pilot at will to substitute hand for automatic control. The electrical motors 12 and 13 are of identical construction and set to revolve the sun gears 10 and 11 in opposite directions so that when the gears are revolved in opposite directions at equal speeds no motion is imparted to the drum 8. The motors 12 and 13 are indicated as shunt field motors, 14 and 15 respectively, indicating the shunt fields of said motors. 16 and 17 respectively indicate the armature connections of said motors. Worm gears are interposed between the motors and the sun gears of the differential. With this construction one of the motors cannot impart rotary motion to the other motor nor can the drum 8 impart rotary motion to either of the motors. As a result the movement of the drum 8 will be controlled by the speed of the motors. With the use of the worm as shown in Figure 8, the motors cannot be driven by the sun gears.

The motors 12 and 13 are driven by means of a source of electricity 18 which is connected by line 19 and line 20 to lines 21 and 22 leading to the armature 16 and 17 respectively, and hence by lines 23 and 24 respectively back through a line 25 having the switch 26 to the source 18. Lines 21 and 22 respectively also connect the source of energy 18 through rheostats 27 and 28 respectively with the shunt field 14 and 15 respectively of the motors, the other end of the shunt fields being connected by the lines 29a and 30a with the lines 23 and 24 respectively. The rheostats 27 and 28 may be adjusted so as to normally cause the motors 12 and 13 to revolve at identically equal speeds, a condition under which no motion will be imparted to the drum 8.

The automatic control of the motion of the drum 8, and hence of the ailerons of the airplane, is affected by shunting one of the rheostats 27, 28 when the ship revolves out of the desired position relative to the longitudinal axis of the airplane. For this purpose, the apparatus is normally adjusted so that in normal operation the rheostats 27 and 28 offer a large resistance to the current flowing in the fields 14 and 15 to the motors so that when the rheostats are short circuited the corresponding motor will greatly reduce its speed.

The short circuiting of the rheostats 27 and 28 is effected by a member 29 which is responsive to the degree of banking or revolution of the ship about its longitudinal axis. The instrument most commonly used for indicating the bank of the ship is a mercury bulb contained in a glass tube and operating as a spirit level. A pendulum purposely mounted in anti-friction bearings has proven satisfactory and in the present drawings I have shown the member 29 as a pendulum type of indicator it being understood that any instrument that will indicate the degree of bank about the longitudinal axis can be used. In the drawings 30 indicates the pendulum of the indicator which is pivoted at 31 and connected by line 32 leading to line 19 to the source of energy 18. The pendulum also preferably includes a magnetic brake 33 of any preferred form of construction in order to prevent the pendulum from hunting or swinging back and forth. The pendulum 29 is adapted to make contact with contacts 34 and 35 connected by lines 36 and 37 to the shunt fields 14 and 15 respectively.

In the automatic operation of the apparatus thus described, when the ship is in normal position the pendulum 29 will not make contact with either the contacts 34 or 35 and the motors 12 and 13 thus are supplied with field current only through the rheostats 27 and 28. The motors 12 and 13 will be running in opposite directions and at equal speeds. Now assuming, for instance, that the plane in its flight tends to lower the left wing, the pendulum 29 will swing making contact with contact 34. This will short circuit rheostat 27, thereby strengthening the field of the motor 12 and reducing its speed. Motor 13 is still running at its original speed and, therefore, forces the planet gear 6 to revolve with the drum 8 moving the cables 9 leading to the ailerons of the plane in such a way as to bring the left wing of the plane back to the level position. As soon as the level position has been reached the pendulum 29 swings to its central position, thereby breaking contact with contact 34 and allowing the plane to proceed level. Similarly, if the right wing of the plane becomes lower, pendulum 29 swings to the right contact 35, short circuiting rheostat 28 causing a motion of the drum 8 in the reverse direction.

In place of two shunt wound electric motors two compound wound electric motors may be employed in which case the contact making instrument 29 could either open the shunt field of one motor, causing the motor to run at a higher rate of speed as a series motor, or it could be made to short circuit the series field thereby causing the motor to run at a higher rate of speed by virtue of its reduced field strength.

Referring to Figure 3, in this form of the invention I employ a differential 5', the planet gears 6' of which are mounted by a revolvable housing 7' having a drum surface 8' which receives the lines 9' leading to the surfaces of the airplane which are to be controlled. In Figure 3 the apparatus is illustrated for the purpose of controlling the revolution of the plane about its lateral axis and the lines 9' therefore may be considered as leading to the ailerons of the ship and connected therewith in any suitable or preferred manner to elevate one of the ailerons while depressing the other.

The sun gears of the differential 10' and 11' are respectively connected with electrical motors 12' and 13' of identical construction and set to revolve the sun gears 10' and 11' in opposite directions so that when the gears are revolved in opposite directions at equal speeds no motion is imparted to the drum 8. The motors 12' and 13' are indicated as shunt field motors, 14' and 15' respectively indicating the shunt fields of said motors. 16' and 17' respectively indicate the armature connections of said motors.

The motors 12' and 13' are driven by means of a source of electricity 18' which is connected by line 19' and line 20' to lines 21' and 22' leading to the armatures 16' and 17' respectively, and hence by lines 23' and 24' respectively back through a line 25' having the switch 26' to the source 18'. Lines 21' and 22' respectively also connect the source of energy 18' through rheostats 27' and 28' respectively with the shunt field 14' and 15' respectively of the motors, the other end of the shunt fields being connected by the lines 29a' and 30a' with the lines 23' and 24' respectively. The rheostats 27' and 28' may be adjusted so as to normally cause the motors 12' and 13' to revolve at identically equal speeds, a condition under which no motion will be imparted to the drum 8'. The apparatus described in Figure 3 is identical with the apparatus described in Figure 8 with the exception that no worms or worm gears are provided nor is a clutch or clutches provided and the description of Figure 8 would therefore suffice for the description of Figure 3 with the exception of these elements.

Now referring to Figure 4, the automatic means for controlling the flippers of the ship may be identical to those illustrated in Figure 8 for controlling the ailerons, excepting that the indicator of the pitch of the ship is used rather than the indicator of the bank of the ship. In Figure 4 the connections with such indicators are shown. Generally a pitch indicator on an airplane is controlled by a gyroscope, which gyroscope receives its power as a result of a vacuum created by a Venturi tube placed on the outside of the ship. The gyroscope operates an indicator hand 40 placed on a dial 41 to connect such an indicator with mechanism for automatically controlling the flippers. The wire 32 of Figure 8 is shown as connecting with the indicator arm 40 and the indicator arm 40 is indicated as adapted to make contacts with contacts 34 and 35 which lead to the shunt fields of the motor. It is understood that the cable 9 of course, in such apparatus will lead to the flippers of the ship. Such an apparatus will automatically operate to maintain the pitch of the ship on the level. It will also be seen that by having the contacts 34 and 35 movably mounted on the dial 41, the apparatus can be set so as to maintain any desired pitch.

The indicating hand shown in Figures 4, 5, 6, 7, 9, 10 is insulated from the shaft which turns the indicating hand in these figures.

Referring to Figure 9 the pendulum member 9 as indicated in Figure 8 makes contact with adjustable contact members 78 and 79. These members have been substituted for the members 34 and 35 shown in Figure 8. Contact members 78 and 79 are threaded through suitable supports 80 and 81 in order to effect the proper adjustment. The adjustment of the members 78 and 79 is effected in order to cause the automatic control mechanism to be actuated in order to allow for fine or coarse adjustment and to compensate for conditions arising during the use of the plane.

In Figure 10 the pendulum 100 is caused to move over rheostat contacts 82 having any desired number of contact points. In effect Figure 10 illustrates a rheostat or movable contact member 100, which when in a substantially vertical position does not make contact with any of the contacts 82 but when moved to the right or left progressively cuts in or cuts out resistance to effect the speed of the motors 12 and 13. This allows a more exact and a more flexible control than that illustrated by the member 30 in Figure 8 or member 40 in Figure 4 or member 90 in Figure 9.

In Figure 11 the cables 9 which are the same as those shown in Figure 8 control or move an arm 91, which is pivoted at 92, which moves a rod or other member 93 which in turn is connected to the throttle not shown of the motor which drives the airplane. When the mechanism illustrated in this figure is used the indicating member shown in Figures 3, 4, 8, 9 and 10 would be the indicator which indicates the speed of the airplane. This indicating member is set at zero at the speed at which it is desired to maintain and moves to the right or left as the speed increases or decreases. As an example, if the speed decreases the arm (for instance arm 40 illustrated in Figure 4) moves to the left and makes contact with the member 34. This causes the motor 12 to move at a different speed (for instance slower speed) than the motor 13, causing the drum to rotate in a direction to pull one of the cables 9 which pulls the lever 91 in a direction to move throttle 93 to feed more fuel to the motor so as to increase the speed of the motor. When the speed of the plane has been increased so that the indicator 40 moves to a neutral position, it breaks contact with the member 34 and consequently does not further increase the speed. If the speed of the plane increases beyond the speed at which the speed indicating instrument has been set the arm 40 will move to the right and cause by the connections above described a decrease in the speed of the airplane, whereupon the arm 40 will move to a neutral position and break the connection with member 35.

The apparatus for controlling the altitude of the ship may be the same pendulum which is illustrated in Figure 8 and numbered 30 or that illustrated in Figures 3, 4, 9 and 10. In this case the altitude at which it is desired to operate the ship is ascertained and the indicating hand of the altimeter or any other altitude indicating instrument is set at zero. When the plane moves to either a higher or lower altitude so as to move the indicator hand away from the zero point a contact is made. Figure 4 indicates diagrammatically an instrument which could be used to determine the altitude and which has been set at zero and which if the plane moves up or down the hand 40 will be caused to move to the right or left causing the contact to be made with member 34 or 35 which will cause a difference in speed between the motors 12 and 13 which will in turn serve to rotate the drum 9 in one or the other direction according to which motor revolves at the greater speed. This will operate the flippers 3 or the stabilizer 3' according to which of these members is connected with the cables 9 so as to nose the plane up or down thereby causing it to gain or lose altitude until the hand of the altimeter or other indicating instrument reaches zero position at which time the electrical connections will be broken and the motors 12 and 13 will run at equal speeds until the indicating hand again moves about caused by a change in altitude.

The apparatus for controlling the revolutions of the ship about its rudder axis is also identical with the apparatus illustrated for controlling the flippers and ailerons of the ship or the speed of the ship. In Figure 5 I have illustrated a means by which such an apparatus may be caused to automatically maintain the ship headed into or away from a radio beacon and in Figures 6 and 7 I have indicated means by which the ship may be automatically maintained on any desired compass point.

Referring to Figure 5, 42 and 43 indicate radio loops set at right angles to each other in the airplane and at 45° angle with the longitudinal axis aa of the plane. The members 42 and 43 which are fixed relative to each other may be adjustable relative to the longitudinal axis of the ship to compensate for wind drift or for any other purpose such as for instance where it is desired to fly at an angle to a radio beacon. The transformers 44 and 45 respectively connect with radio tubes 46 and 47 and include in their connections induction coils 48, 49 and condensers 50 and 51, which serve as a means for adjusting the current to the frequency of the radio beacon. 52 indicates a source of energy for the filaments of the tubes 46 and 47 and 53 indicates a source of power for the indicating instrument which is indicated at 54. The indicating instrument 54 is a differential volt meter connected by lines 55 and 56 with the tubes 46 and 47. Each of these circuits being wired in identical manner. The current supplied from one loop through the differential volt meter counteracts the effect of the current from the other loop. Any difference in strength in these currents will cause the indicating arm 57 to move in one or the other direction.

Assuming it is desired to fly the plane directly towards a radio beacon, then both radio loops will receive exactly the same intensity and consequently will be causing exactly the same current to flow in the two separate coils of the meter. Whenever the ship varies from its course one or the other of the loops would receive a stronger wave from the radio beacon causing the meter to be deflected. The meter hand 57 is connected in the apparatus 54 by connecting line 32 to the meter hand and by positioning contacts 34 and 35 where they will engage the meter hand 57 whenever said hand moves from its zero position. By this construction whenever the ship deviates from the direction of the radio beacon the apparatus will automatically turn the rudder and hence the ship to bring it back into the correct line of flight.

If desired the rudder may be controlled by a compass in place of the radio beacon apparatus of Figure 5. In Figure 6 an apparatus for this purpose is illustrated comprising an indicating instrument 56a, preferably of an earth inductor compass. The indicating arm 58 of which is provided with a roller 59 adapted to make contact either with contacts 34 or 35, which are in form of rings having an insulating gap 60 therebetween. The indicating arm 57 should be connected with the line 32 or 32' respectively of Figure 8 or 3. The contacts 34 and 35 of such an instrument are movably mounted on the dial of the instrument so that the zero or insulating section 6 may be pointed towards a position on the compass.

By connecting the compass in the apparatus of Figures 8 or 3 and running in lines 9 or 9' respectively to the rudder of the airplane, the airplane will be automatically controlled to head the ship into the direction determined by the position of the insulating space between contacts 34 and 35.

It will also be apparent that the differential control of Fig. 8 or 3 may, if desired, when connected to the flippers, as described heretofore be operated by the air speed indicator of an airplane in such a manner as to cause the ship to nose down and increase the speed whenever the air speed falls below a certain value which will have the advantage of eliminating largely the danger of tail spins from loss of forward speed. Or, if desired, the flippers of the ship could be connected to the indicator on the altimeter so as to maintain the ship automatically at any desired elevation.

There is also preferably provided a means to prevent the drum 8 from turning beyond a desired maximum position in either direction. For this purpose a lug 61 is indicated on the drum adapted to make contact with the lug 62 on a stationary frame when the drum has reached the desired maximum position. A similar lug 63 is shown on the drum for engaging the lug 64 on the frame to limit the motion of the drum in the opposite direction.

While the means for a method of automatically controlling an airship herein described is well adapted for carrying out the objects of the present invention, it is understood that various changes and modifications may be made all coming within the scope of the appended claims.

I claim:

1. An airplane comprising a control surface, a differential connected to operate said control surface, a pair of normally energized electric motors connected to said differential, said electric motors being balanced whereby normally the motors are prevented from moving the control surface, a member responsive to the motion of the plane about an axis, and an unbalancing electric control connection between said motors and said member.

2. An airplane comprising ailerons, elevators and rudder surfaces being connected with a differential, means for driving said differentials normally balanced to prevent movement of the ailerons, flippers and rudder when the ship is properly coordinated, members responsive to the motion of the plane from its proper position and means to unbalance the motors thereby driving said differentials and controlled by said members for automatically actuating the ailerons, flippers and rudder of said plane.

3. An airplane comprising a control surface, a differential, a connection between one of the gears of said differential and said control circuit, a pair of normally energized electric motors connected to the other gears of said differential, means for normally operating said motors at balanced speed whereby to maintain the gear connected with said control surface stationary, a member responsive to the movement of the plane about one of its axes, an unbalancing electric control connection between said motors and said member, and a means for disconnecting said motors from said differential.

4. An airplane comprising a control surface, a differential, a connection between one of the gears of said differential and said control surface, a pair of normally energized electric motors connected to the gears of said differential, reversible gears between the differential gears and said electric motors, means for operating the electric motors normally at balanced speed, a member responsive to the motion of the plane about one of its axes, and an unbalancing electric control connection between said motors and said member.

5. An airplane comprising a control surface, a differential having its planetary gears connected to said control surface, normally energized electric motors connected to the planetary gears of said differential, means for normally driving said electric motors at balanced speed, a member responsive to the motion of the plane about one of its axes, and an unbalancing electric connection between said motors and said member.

6. An airplane comprising a rudder, a radio beacon direction indicator, a differential having its planetary gear connected to operate said rudder, a pair of normally energized electric motors connected to said differential, means for normally driving said electric motors at balanced speed and means interconnecting said radio beacon direction indicator with said electric motor for unbalancing the same whenever the airplane deviates from the line of said radio beacon.

ERLE PALMER HALLIBURTON.